No. 648,505. Patented May 1, 1900.
I. W. J. LINDBOHM.
ELECTRIC FISHING APPARATUS.
(Application filed Feb. 12, 1900.)
(No Model.)
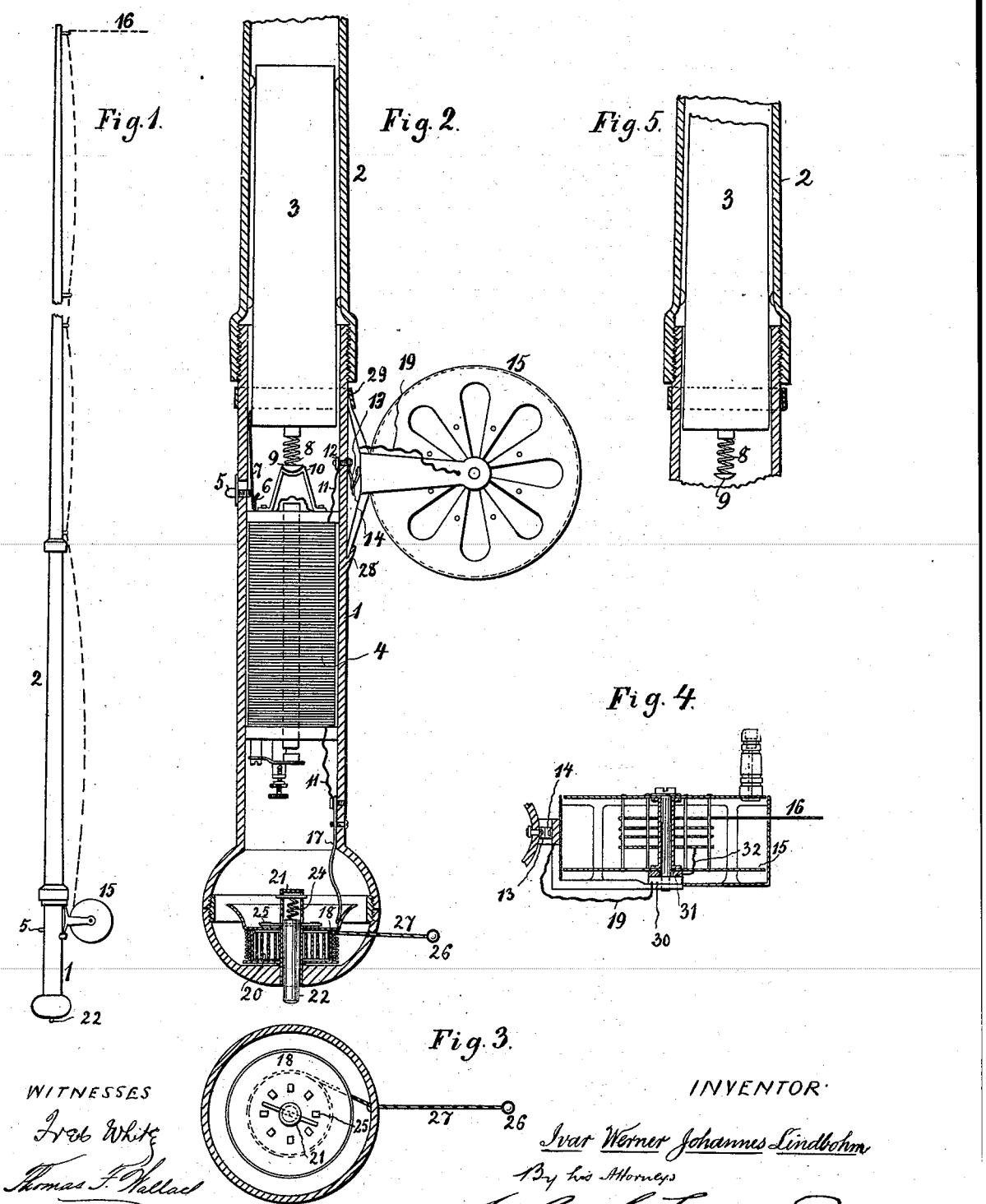
WITNESSES
INVENTOR
Ivar Werner Johannes Lindbohm
By his Attorneys

UNITED STATES PATENT OFFICE.

IVAR WERNER JOHANNES LINDBOHM, OF HELSINGFORS, RUSSIA.

ELECTRIC FISHING APPARATUS.

SPECIFICATION forming part of Letters Patent No. 648,505, dated May 1, 1900.

Application filed February 12, 1900. Serial No. 4,907. (No model.)

*To all whom it may concern:*

Be it known that I, IVAR WERNER JOHANNES LINDBOHM, a subject of the Grand Duke of Finland, residing at Helsingfors, Finland, Russia, have invented certain new and useful Improvements in Electric Fishing Apparatus; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to apparatus for facilitating the capture of fish by killing or stunning them by means of an electric shock; and it consists in providing a fishing-rod with electrical appliances whereby a fish on seizing the baited hook receives an electric shock sufficiently severe to prevent it from so struggling as to escape from the hook or break the tackle.

According to my invention the fishing-rod, which is more especially designed for the capture of salmon and other large and powerful fish, is provided with an electric battery which may be put by the person manipulating the rod into circuit with the primary winding of an induction-coil whose secondary winding is connected, on the one hand, with an insulated conductor to which the fish-hook is attached and which constitutes or is in one with the "fishing-line," properly so called, and on the other hand, with a second insulated conductor forming a so-called "trailing line." The end of this trailing line is during the fishing operation immersed in the water, so that when a fish seizes the hook the person holding the rod can, by merely pressing a knob, close the circuit through the battery and induction-coil, thus sending a powerful current through the secondary circuit of the coil, which circuit is completed through the water and the body of the fish, the latter being in consequence either killed outright or so stunned as to be rendered incapable of offering resistance to capture.

The fishing-rod itself may be of the usual construction, the battery and induction-coil, or either of them, being separate from and connected with the rod by flexible conductors.

The invention is illustrated in the accompanying drawings, forming part of this specification, wherein—

Figure 1 is a general view of the improved fishing-rod, drawn to a small scale. Fig. 2 is a longitudinal section of the handle end of the rod. Fig. 3 is a cross-section through the knob forming the butt-end of the handle. Fig. 4 is an axial section of the reel for the fishing-line, and Fig. 5 is a longitudinal section of the joint connecting the handle with the main portion of the rod.

The improved fishing-rod in its preferred form comprises a hollow cylindrical handle portion 1, terminating at the butt-end in a hollow spheroidal knob, as shown, and connected by a suitable screw or other joint, as indicated in Figs. 2 and 5, with the main portion 2 of the rod, which may be formed in the usual manner, but has the section next the handle 1 preferably hollow to contain an electric battery 3. It is advisable that the rod and handle be composed of non-conducting material.

Within the handle 1 is the induction-coil 4, electrical connection between which and the battery 3 may be established or broken at will through a switch actuated by means of an external sliding knob 5, situated within convenient reach of the hand. One end of the primary winding of the induction-coil terminates in a contact-spring 6 on top of the coil, the spring 6 being in permanent contact when the coil is placed within the handle 1 with a second contact-spring 7, which by means of knob 5 can be caused to make or break connection at will with a metallic cap or socket inclosing the lower end of the battery 3 and forming one pole of said battery. The other pole of the battery 3 is formed by a spiral spring 8, upon the end of which is soldered a convex metal button 9, which when the handle 1 and main portion 2 of the rod are fitted together engages in a corresponding concavity in a bowed metal bracket 10, fixed on top of the coil 4 and connected to the other end of its primary winding.

The upper end of the secondary winding of the induction-coil is connected by a wire 11 with a terminal screw 12, passing through the wall of the tubular handle 1 and carrying outside the latter a contact-spring 13, which is pressed upon by another contact-spring 14, fixed on the sole-plate of the bracket in which the reel 15 for the fishing-line is mounted to revolve, this reel being fixed to the rod by one arm of its sole-plate being inserted beneath a looped projection 28, fixed on the rod, while the oppositely-directed arm is secured beneath a slidable ring 29. The contact-spring 14 is connected by means of a wire 19 with a metal disk 30, fixed concentrically on one of the bearings in which the reel 15 is journaled, the disk 30 maintaining rubbing contact with a similar disk 31, fixed concentrically on the reel itself and coupled by a wire 32 with the insulated conductor, which constitutes or is in one with the fishing-line 16, as shown in Fig 4.

The lower end of the secondary winding of the induction-coil 4 is connected with the insulated conductor 27, which forms the trailing line, by means of a wire 11, connected by a suitable terminal with a contact-spring 17, which forms rubbing contact with the projecting metallic flange of a spool 18, upon which the trailing line 27 is wound, the conductor itself being in electrical connection with said flange. The trailing line 27 is normally kept coiled upon the spool 18, after the manner of a self-winding tape-measure, by means of a flat spiral spring within the spool, as shown. The spring when put in tension by the drawing out of the line 27 is set free, so as to effect the rewinding of the line by its recoil, by means of a push-button 22, normally pressed outward by a spiral spring 24 and sliding in a fixed tube 20, forming the axial bearing for the spool 18. The inner end of the push-button 22 has an arm or arms 23 projecting through a slot or slots in the wall of the tube 20 and forming a detent pawl or pawls, normally engaging the teeth of a crown ratchet-wheel 25 in one with the spool 18. The line 27 when drawn out is so maintained against the stress of the coiled spring by the engagement of the pawl or pawls 23 with the teeth of the wheel 25, and is automatically rewound when pressure is applied to the button 22, so as to raise the pawl or pawls out of engagement with the teeth. The outer end of the trailing line 27 is provided with a metallic knob or ball 26, serving as a means of grasping the line to facilitate its being drawn out to the required extent, and also as a terminal for the passage of the electric current when the lines 16 and 27 are immersed in the water.

The remaining portion and fittings of the fishing-rod may be of the usual construction. It is to be noted that if the reel 15 and its supporting-bracket be made of conductive material it is advisable that these parts be provided with suitable insulation in order to obviate risk of the person handling the rod receiving accidentally a shock of electricity in the event of his touching simultaneously some portion of the conductors 16 and 27 from which the insulation may have been stripped or worn away.

In using the improved fishing-rod it is only necessary when the baited hook at the end of the fishing-line 16 has been thrown into the water to draw out and immerse the end of the trailing line 27, and then upon a fish seizing the hook to press or slide the button 5, when an electric current is transmitted from the secondary winding of the induction-coil 4 through the line 16, the hook, the body of the fish, the water, and the trailing line 27 back to the induction-coil. By this means the fish is instantaneously killed or so stunned as to be easily landed, whereupon the circuit between the battery 3 and coil 4 may be broken by means of the button 5 in readiness for the next capture.

It will be obvious that the battery and induction-coil and the spool for the trailing line may be attached externally of the rod; but the arrangement above described and illustrated in the drawings is preferred, as being most convenient for handling and transport.

Having now particularly described and ascertained the nature of my invention, what I claim, and desire to secure by Letters Patent, is—

1. Apparatus for facilitating the capture of fish by killing or stunning them by means of an electric shock, consisting of an electric induction-coil whose primary winding is in circuit, through a switch normally open, with a battery or other source of electric energy, and whose secondary winding is connected on the one hand with the fish-hook through an insulated conductor in one with the fishing-line, and on the other hand with the water through a conductor immersed therein, so that on closing the switch an electric current generated by induction in the secondary winding of the coil will pass thence through, the insulated conductor, the fish-hook, the body of any fish which may have seized said hook, the water, and the immersed conductor back to said secondary winding.

2. The combination with a fishing-rod of an electric battery; an induction-coil whose primary winding is in circuit with said battery; a switch controlling said circuit and normally open; and a reel upon which is wound a conductor connected to one end of the secondary winding of said induction-coil and adapted to be immersed in the water; and a reel for the fishing-line adapted to maintain electrical connection between the other end of said secondary winding and an insulated conductor which is in one with the fishing-line and is connected with the fish-hook, the whole being constructed and operating substantially as specified.

In testimony that I claim the foregoing as my invention I have signed my name in presence of two subscribing witnesses.

IVAR WERNER JOHANNES LINDBOHM.

Witnesses:
F. KOLSTER,
R. CERTI.